(No Model.)
M. NEFF.
FENCE.
No. 547,858. Patented Oct. 15, 1895.
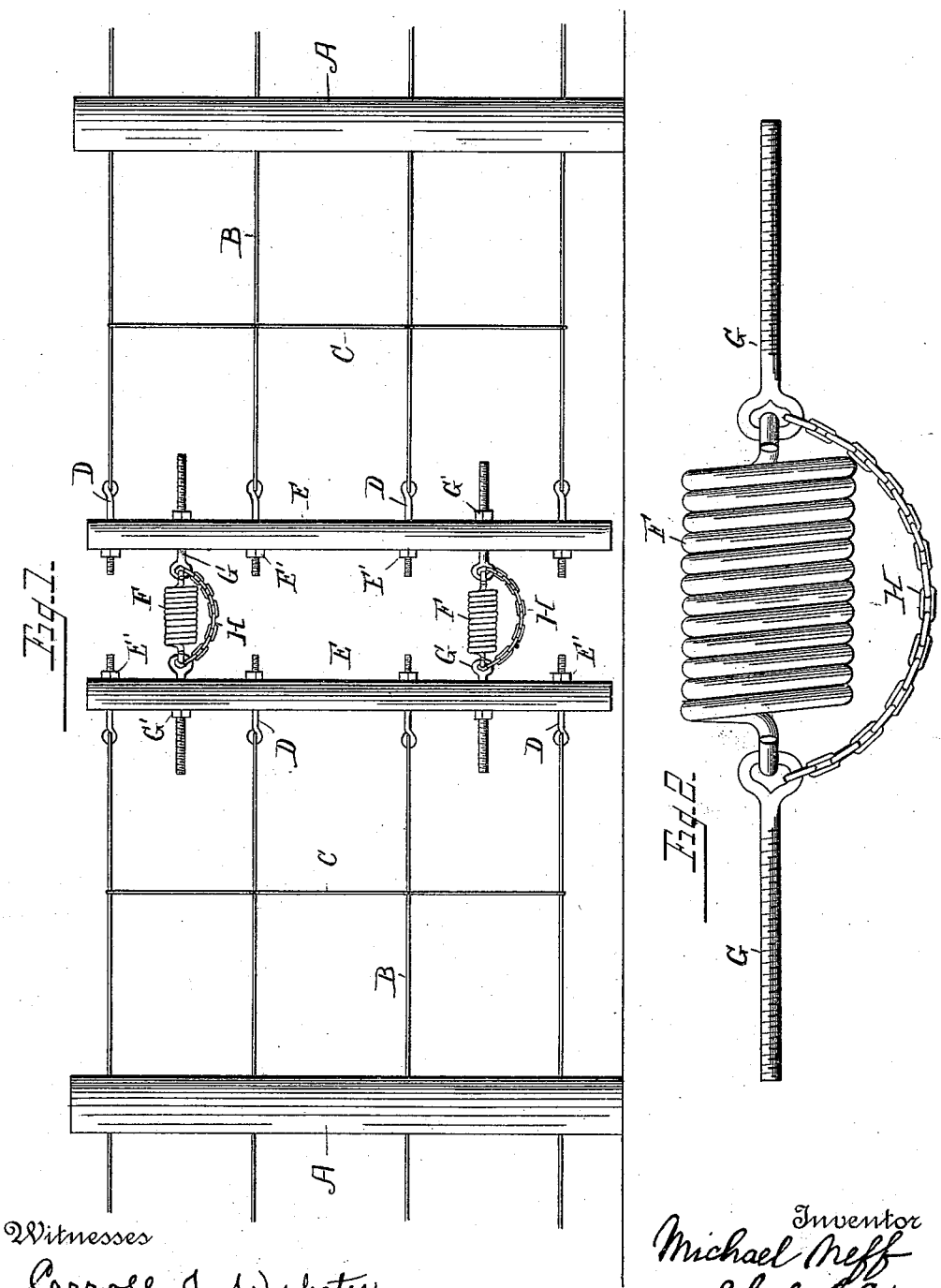
Witnesses
Carroll J. Webster
Thos. Val. Brown
Inventor
Michael Neff
By Charles E. Adamson
Attorney

United States Patent Office.

MICHAEL NEFF, OF TABOR, INDIANA.

FENCE.

SPECIFICATION forming part of Letters Patent No. 547,858, dated October 15, 1895.

Application filed April 15, 1895. Serial No. 545,753. (No model.)

*To all whom it may concern:*

Be it known that I, MICHAEL NEFF, a citizen of the United States, residing at Tabor, in the county of Delaware and State of Indiana, have invented certain new and useful Improvements in Fences; and I do hereby declare the following to be a full, clear, and exact description of the invention, such as will enable others skilled in the art to which it appertains to make and use the same.

My invention relates to improvements in fences, and especially such as used around farms and pasture-fields.

The objects of my invention are to construct what is commonly called a "wire fence," and to arrange the ends of the wires so that each wire may be tightened, and to connect the ends of each long section of wires together by spring-tension. I attain these objects by the mechanism illustrated by the accompanying drawings, in which—

Figure 1 is a side elevation, and Fig. 2 is a detail view.

Similar letters refer to similar parts throughout both views.

A A are the supporting-posts, which I prefer to make of hollow iron pipe, providing holes through which the wires B pass, and setting the posts firmly in the ground. These posts may be set a considerable distance apart and between them I secure tie-wires C to more firmly secure the wire B together. The ends of each section of the wires B are secured to the screw-hooks D. The said hooks pass through the upright stays E and have a nut E' bearing against the stays, so that they may be drawn up to tighten the wires B, all as shown in the drawings. These stays E are connected together by the springs F F, as shown in the drawings. Screw-hooks G pass through the upright stays E E, the adjacent ends of these hooks between the stays being connected to the opposite ends of the springs F, and on the other side of the stays they are held by the nuts G', which bear against the stays, so that by adjusting the nuts any amount of tension may be given to the wire sections, and the springs F will prevent the wires from becoming too light or too loose from the effect of heat and cold on the said wires. I attach a short chain H to the eyes of the hooks G, which is adapted to hang loosely when the springs are not stretched beyond their natural or ordinary length, so that the springs may not be ruined by being stretched, as in case of an animal running against the fence or an over-strain on the section, the chain allowing the spring to give just so far. Each wire may be given the proper amount of tension by the screw-hooks D, and the sections being secured together by the springs the fence is not liable to become loose and sagged or the wire broken by becoming too tight. Should any one or more of the wires B become broken, a sufficient amount of slack may be given the broken wire for connecting the broken ends by unscrewing the nut on the hook D that is connected to the broken wire.

A very important feature in the construction, as shown and described, is that an opening or passage-way through the fence may be readily made at any place where the sections are connected by removing the nuts G' on two of the hooks G and lifting each section end around out of the way, making it very desirable for a farm or pasture fence.

Having thus described my invention, I claim the following and desire to secure the same by Letters Patent:

1. A fence constructed in sections, each section consisting of longitudinal wires, having one end adjustably secured to a stay, devices on the stay for independently adjusting each wire, a spring connection between the adjacent stays of the adjacent sections, and independent devices for adjusting the tension of the said spring, substantially as described.

2. A fence constructed in sections, each section consisting of longitudinal wires having one end secured to a stay, a spring interposed between the adjacent stays for securing the stays together and a chain having its opposite ends secured to the stays being of a length equal to the ordinary stretch of the spring, substantially as described.

In testimony whereof I affix my signature in presence of two witnesses.

MICHAEL NEFF.

Witnesses:
J. R. POLK,
E. J. TOMLINSON.